Feb. 22, 1938.   K. EHRGOTT   2,109,212
TWO-COMPARTMENT FRY KETTLE
Filed May 29, 1936   2 Sheets-Sheet 1
Fig. 1.
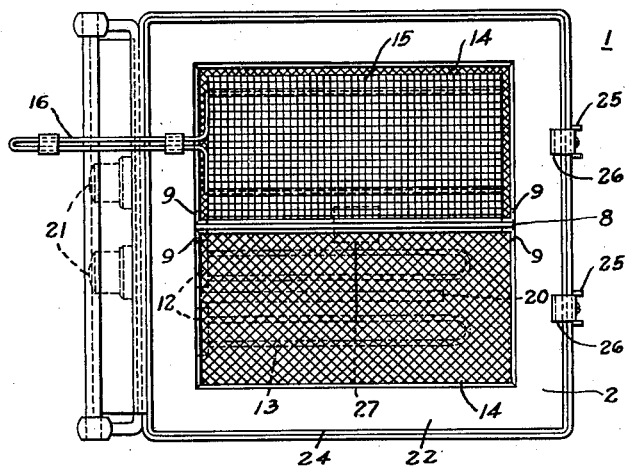
Fig. 2.
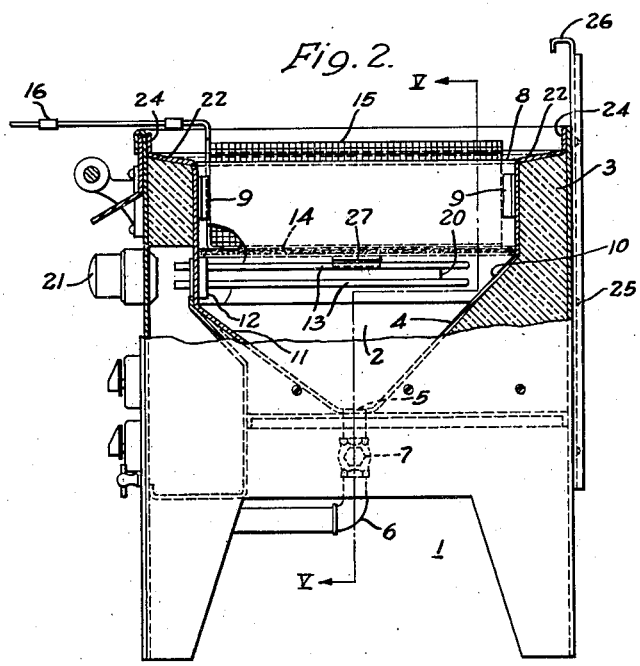
Fig. 4.
WITNESSES:
Michael Stark
W. H. Whitten
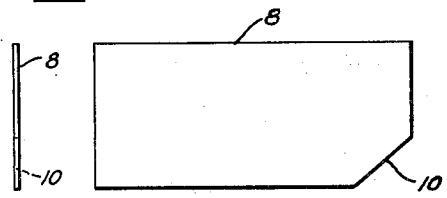
Fig. 3.
INVENTOR
Karl Ehrgott.
BY W. R. Coley
ATTORNEY Feb. 22, 1938.                K. EHRGOTT                 2,109,212
                        TWO-COMPARTMENT FRY KETTLE
                         Filed May 29, 1936         2 Sheets-Sheet 2
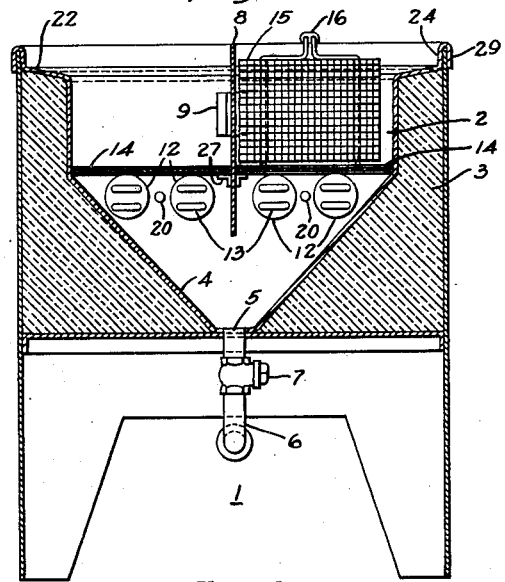
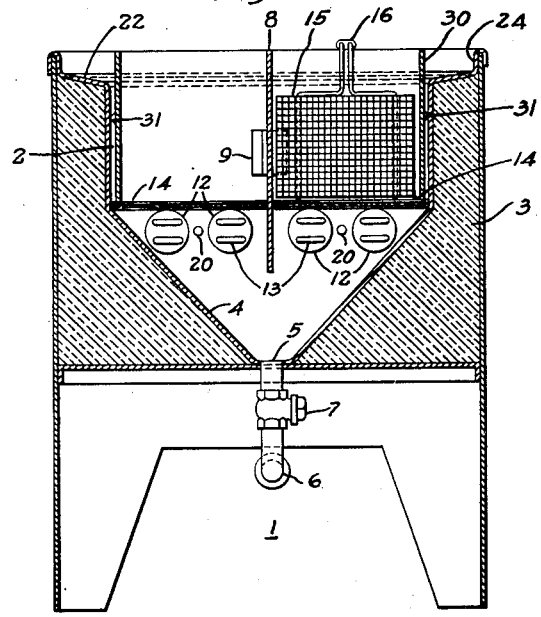
WITNESSES:                                            INVENTOR
                                                   Karl Ehrgott.
                                                   BY
                                                        ATTORNEY Patented Feb. 22, 1938

2,109,212

UNITED STATES PATENT OFFICE 2,109,212

TWO-COMPARTMENT FRY KETTLE

Karl Ehrgott, Wilkinsburg, Pa., assignor to Westinghouse Electric & Manufacturing Company, East Pittsburgh, Pa., a corporation of Pennsylvania Application May 29, 1936, Serial No. 82,425

6 Claims. (Cl. 53—7)

This invention relates to cooking apparatus, particularly for use in restaurants.

It is an object of this invention to provide a fry kettle which shall serve the needs of the restaurant and occupy less space than has heretofore been required for a device capable of the same service.

It is a further object of this invention to provide a fry kettle in which the body of hot fat is capable of being divided into several smaller bodies which can be maintained at different temperatures.

It is a further object of this invention to removably support a partition within the kettle. Partitions either removably or permanently supported within the kettle will serve to produce several smaller compartments.

It is a further object of this invention to provide for removing settlings from all of the several compartments at once.

It is a further object of this invention to provide a foam guard which may be supported on a screen or directly on the kettle bottom and which may serve to support partitions.

It is a further object to provide a foam guard within the kettle and support a grid at the bottom of the foam guard.

It is a further object to provide for so supporting a partition that it may be removed without disturbing the grid.

Other objects of the invention and details of the apparatus will be apparent from the following description and the accompanying drawings, in which Figure 1 is a top plan view of a fry kettle embodying my present invention.

Fig. 2 is an elevational view, partly in section thereof.

Fig. 3 is a side elevational view of the partition.

Fig. 4 is an end elevational view of the same.

Fig. 5 is a vertical sectional view taken on the line V—V of Fig. 2; and,

Fig. 6 is a central vertical sectional view of a modification.

In the drawings, I show a range or cooker 1 in which this invention is employed. It contains a receptacle 2 surrounded by heat insulation 3 and adapted to contain a body of fat. The lower portion of the receptacle 2 has oblique walls 4 converging to an exit 5 from which leads a drain pipe 6 controlled by a valve 7 through which the molten fat may be drained. A partition 8 is supported in a vertical position in the container 2 for separating it into compartments. The partition 8 is held in place, either permanently by welding to the kettle walls, or removably by channel or angle irons 9 secured to the side walls of the container 2. It may be inserted by sliding it between the angle irons 9 until it rests upon the oblique wall 4 of the lower part of the receptacle 2. One corner of the partition is cut way, as indicated at 10 in Fig. 3, to accommodate it to the oblique wall 4. The opposite oblique wall 11 starts from a lower portion of the side wall so that the corresponding end of the partition does not need to be cut away. The heads 12 of the heaters 13, by which the body of fat is heated, are thus accommodated.

In each compartment of the receptacle 2, a horizontal grid 14 is conveniently supported in any desired manner. Supports 27 may be secured to the partition 8 to hold up the inner edges of the grids 14. These supports, however, may be omitted and the grids may removably rest on the top of the oblique walls 4 and 11. The grids 14 each support a basket 15 in which the articles to be cooked are placed. One basket 15 is illustrated in the compartment farthest from the reader in Fig. 2, but a plurality of baskets would be supplied and any basket may be placed in any compartment. Each basket is provided with a handle 16 by which it may be inserted in or removed from the fat and, when inserted, the basket rests upon the grid 14.

The heaters 13 are located in each compartment at a height just below the grids 14 and thus within the bottom zone of the kettle. Adjacent each heater a thermostat 20 is located. The adjustable control devices for the thermostats are at the front of the cooker, and are indicated at 21. Each thermostat controls its adjacent heaters by means which, being of any familiar or conventional form, are not illustrated. An outlet fitted with a quick-acting valve is provided at the exit 5 of the receptacle 2 for all of the compartments thereof which leads to the drain pipe 6.

A ledge 22 all around the kettle forms the top closure for the space containing the heat insulation 3. It is surrounded by an upstanding flange 24 which prevents the escape of foam. At the back of the kettle, a channel iron 25 is secured, its side walls constituting ribs projecting backward from the kettle. The channel iron extends above the flange 24 and its ribs are there cut off, leaving its floor which is bent to form a hook 26.

In the modification shown in Fig. 6, a foam guard 30 is inserted in the fat container. This is a rectangular frame spaced away from the sides by offsets 31 and extending to the grid 14. Its function is to protect the edges of the top of the fat from foam.

In the operation of the device, fat is placed in the receptacle 2 and heated by the heaters 13 until it has melted so that the various compartments of the receptacle are filled with molten fat. The liquid fat extends above the grid 14. The thermostat in any one compartment is so adjusted by its controls 21 that the heater 13 of that compartment will heat the fat to the selected temperature and the thermostat 20 in that compartment will cut off the heat when the fat has reached that temperature.

The partition 8 being in place, the temperature in one compartment will be substantially unaffected by the heaters in the other compartment. The part of the container 2 below the lower edge of the partition 8 will be the cooler part of the fat in each instance and convection will, therefore, not cause hot fat from one compartment to travel into another compartment. The upper part of the fat is therefore, maintained at the selected temperature and the selection may be different for each compartment.

When the fat is hot, the article to be cooked is placed in the basket 15 and the basket is placed in the compartment having the temperature appropriate to that article. When the articles are immersed the bubbles formed make a foam which is received on the ledge 22 but is kept by the flange 24 from overflowing. The steam can escape from the foam or the bubbles break on the ledge and the fat drains back into the kettle.

The basket rests upon the grid 14 in its compartment and any particles, which separate from the articles being cooked and settle into the fat, gather in the bottom part of the receptacle 2 and are sufficiently removed from the baskets which may be in other compartments to be without effect upon the articles being cooked there. It is thus possible to cook different articles in the different compartments, each at its appropriate temperature. At appropriate intervals, the used fat is drawn off through the pipe 6, the settlings passing off with it. The settlings are strained out and the fat is returned to the kettle to be reused. The fat in the kettle can thus be kept clean in all of the compartments.

It is thus possible to use, in one body of fat, temperatures of various degrees and as many different temperatures may be employed at one time as there are compartments.

When the basket 15 is removed from the fat, it is rested on the shelf 22 at the rear of the kettle, the upper edge of the basket being engaged under the hooks 26. This allows the basket to tip, its front edge being lower than the shelf 22, and the fat adhering to the basket and its contents will then drain into the receptacle 2. When the draining is complete, the basket may be removed without waste of fat or danger of greasing the floor.

In the form shown in Figs. 1 to 5, when the partition 8 is removed, the grids remain in the kettle. If the supports 27 are used the grids 14 tilt enough to permit the supports to pass and then return to their position on the top of the oblique wall. If desired, the partition 8 can be kept free from the grid 14. The partition can then be removed without removing the grid 14 and the whole of the fat be brought to one temperature and used to cook the contents of several baskets or of one large basket.

In the form shown in Fig. 6, the angle irons 9 are mounted not on the sides of the receptacle 2 but on the foam guard 30.

In the frying operation, the evaporation of water clinging to the food to be fried and also inherent in the food itself, produces steam particles, which are immediately imprisoned in a film of fat. This action may be so rapid that a large quantity of foam may be produced on the surface of the fat in the container and may overflow onto or over the top edge of the container.

In the form shown in Fig. 6, with the foam guard in place, the articles being cooked are kept from the sides of the receptacle. Bubbles from them do not rise near the side walls. Consequently, foam is not formed near the sides but inside the foam guard and condenses on the walls thereof, and the ledge 22 is not needed to protect the floor. Sufficient protection is given by the part of the foam guard that extends above the top of the kettle. The ledge 22 is nevertheless retained in this form in order that the kettle may be used without the foam guard when desired.

Although I have described and illustrated only one partition making only two compartments, it is obvious that as many partitions and as many compartments as desired may be provided.

In the practice heretofore followed, a restaurant must provide a separate kettle for each temperature and in the ordinary short-order business many of the kettles would be idle during a large part of the time. With this device, less floor space and less invested capital is necessary to enable the restaurant keeper to be prepared to cook orders requiring different temperatures, promptly upon receipt of the order.

When a larger order needs to be cooked which would require more space than one compartment affords, the partition 2 may be removed and the fat in all the compartments brought to the same temperature. If, at the time the partition is removed, one compartment is much cooler than the others, convection will quickly bring it nearly to the desired temperature and the heaters 13 in that compartment will soon bring it to the common temperature. Of course the thermostats associated with each compartment will all be set for the temperature desired for the common compartment when the partition is removed. The apparatus is, therefore, adapted either to cook several orders requiring different temperatures at the same time or to cook one large order requiring a large body of fat.

Although I have described provision for a single partition, any number of partitions to be used together or singly may be supplied. Many other advantages of this device will be apparent and many modifications beside those specifically named will readily be made by those skilled in the art. I, therefore, do not desire to be restricted by the exact structure described and illustrated, but the only limitations intended are expressed by the claims.

I claim as my invention:

1. In a cooker, a receptacle, non-horizontal means for dividing said receptacle into compartments, said dividing means stopping short of the bottom of said receptacle, and means individual to the several compartments for heating the contents thereof.

2. In a cooker, a receptacle, non-horizontal means for dividing said receptacle into compartments, said dividing means stopping short of the bottom of said receptacle, and separately controllable means individual to the several compartments for heating the contents thereof, whereby the several compartments may be maintained at different temperatures.

3. In a cooker, a receptacle, means removably secured in place for dividing it into compartments, a heater and a thermostat in each compartment, whereby the temperature of each compartment may be individually determined, means for supporting articles to be cooked in any compartment, said means when the dividing means are removed serving to support articles in the united compartment.

4. In a cooker, a receptacle, a foam guard removably mounted in said receptacle, and a partition dividing the receptacle into compartments and extending below the bottom of the foam guard, and means on said foam guard for positioning said partition.

5. In a cooker, a receptacle, a foam guard removably mounted in said receptacle, a partition dividing the receptacle into compartments integral with said foam guard and extending below the bottom thereof, and individually energized heaters in said receptacle, the partition extending below said heaters whereby the several compartments may be brought to individually determined temperatures.

6. In a cooker, a receptacle, a foam guard removably mounted in said receptacle, a partition dividing the receptacle into compartments separate from said foam guard and supported independently thereof, and extending below the bottom thereof, and individually energized heaters in said receptacle, the partition extending below said heaters whereby the several compartments may be brought to individually determined temperatures.

KARL EHRGOTT.